United States Patent [19]
Mori et al.

[11] Patent Number: 5,726,842
[45] Date of Patent: Mar. 10, 1998

[54] THIN-FILM TYPE MAGNETIC HEAD HAVING AN AUXILIARY MAGNETIC FILM

[75] Inventors: Taiichi Mori, Yamaga; Akira Gyoutoku, Kumamoto, both of Japan

[73] Assignee: Matsushita Electric Industrial Co., Ltd., Osaka, Japan

[21] Appl. No.: 63,302

[22] Filed: May 19, 1993

[30] Foreign Application Priority Data

May 25, 1992 [JP] Japan .................. 4-131290

[51] Int. Cl.⁶ .................................. G11B 5/127
[52] U.S. Cl. .................................. 360/126; 360/125
[58] Field of Search .................. 360/126, 125, 360/122, 123, 127, 119–121; 29/603

[56] References Cited

U.S. PATENT DOCUMENTS

| | | | |
|---|---|---|---|
| 4,894,742 | 1/1990 | Saito et al. | 360/126 |
| 4,985,796 | 1/1991 | Ihara et al. | 360/122 |
| 4,985,797 | 1/1991 | Yohda et al. | 360/125 |
| 5,029,032 | 7/1991 | Yamada et al. | 360/126 |
| 5,162,960 | 11/1992 | Sakata et al. | 360/126 |
| 5,183,631 | 2/1993 | Kugimiya et al. | 419/10 |
| 5,247,415 | 9/1993 | Kumasaka et al. | 360/125 |

FOREIGN PATENT DOCUMENTS

| | | | |
|---|---|---|---|
| 0175050 | 3/1986 | European Pat. Off. | 360/125 |
| 58-32218 | 2/1983 | Japan | 360/126 |
| 58-70418 | 4/1983 | Japan . | |
| 59-178612 | 10/1984 | Japan | 360/125 |
| 4-167205 | 6/1992 | Japan | 360/125 |

*Primary Examiner*—Jefferson Evans
*Attorney, Agent, or Firm*—Pollock, Vande Sande & Priddy

[57] ABSTRACT

A thin film type magnetic head comprising a magnetic core made of a metallic magnetic material and interposed between two non-magnetic bases is disclosed. An auxiliary film, made of a magnetic material, is disposed on a surface including the magnetic core and not the surface which comes into contact with a recording medium. This arrangement can reduce the size of the magnetic head while preventing the lowering of the reproduction output.

23 Claims, 8 Drawing Sheets

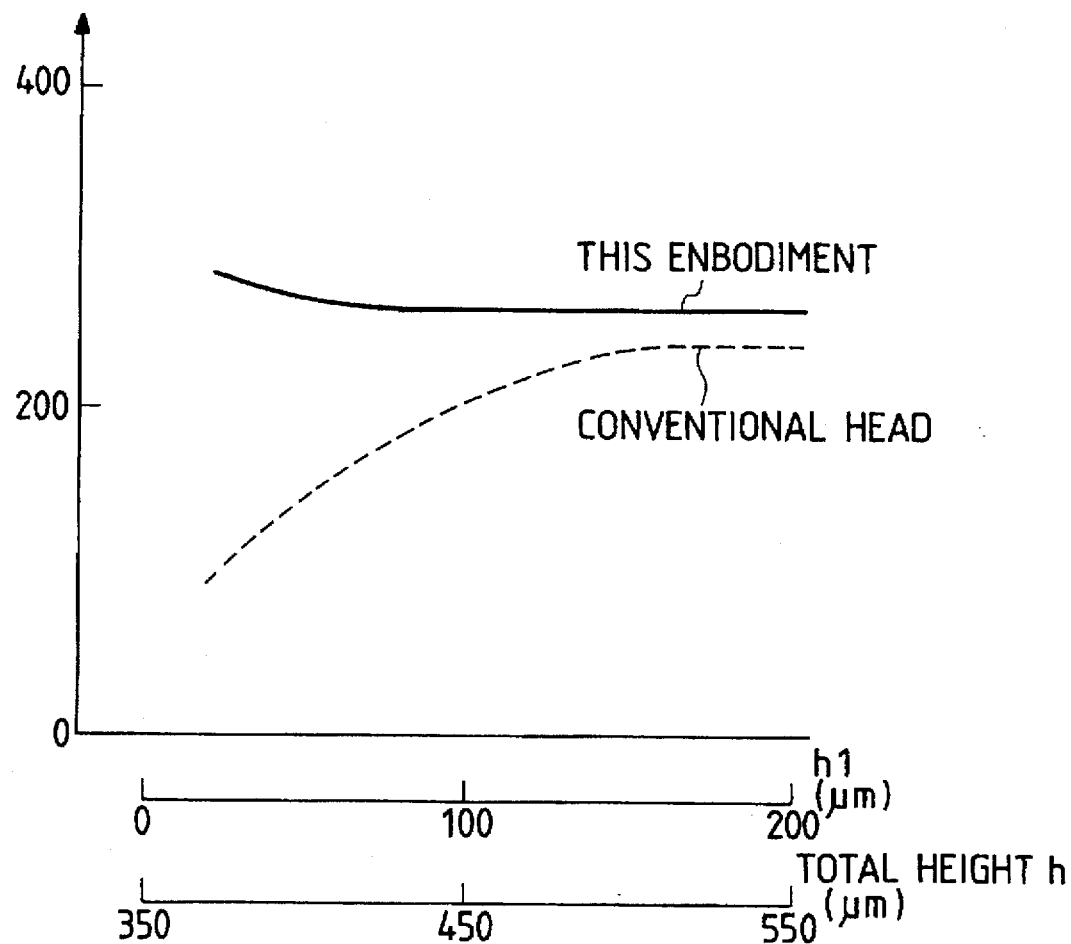

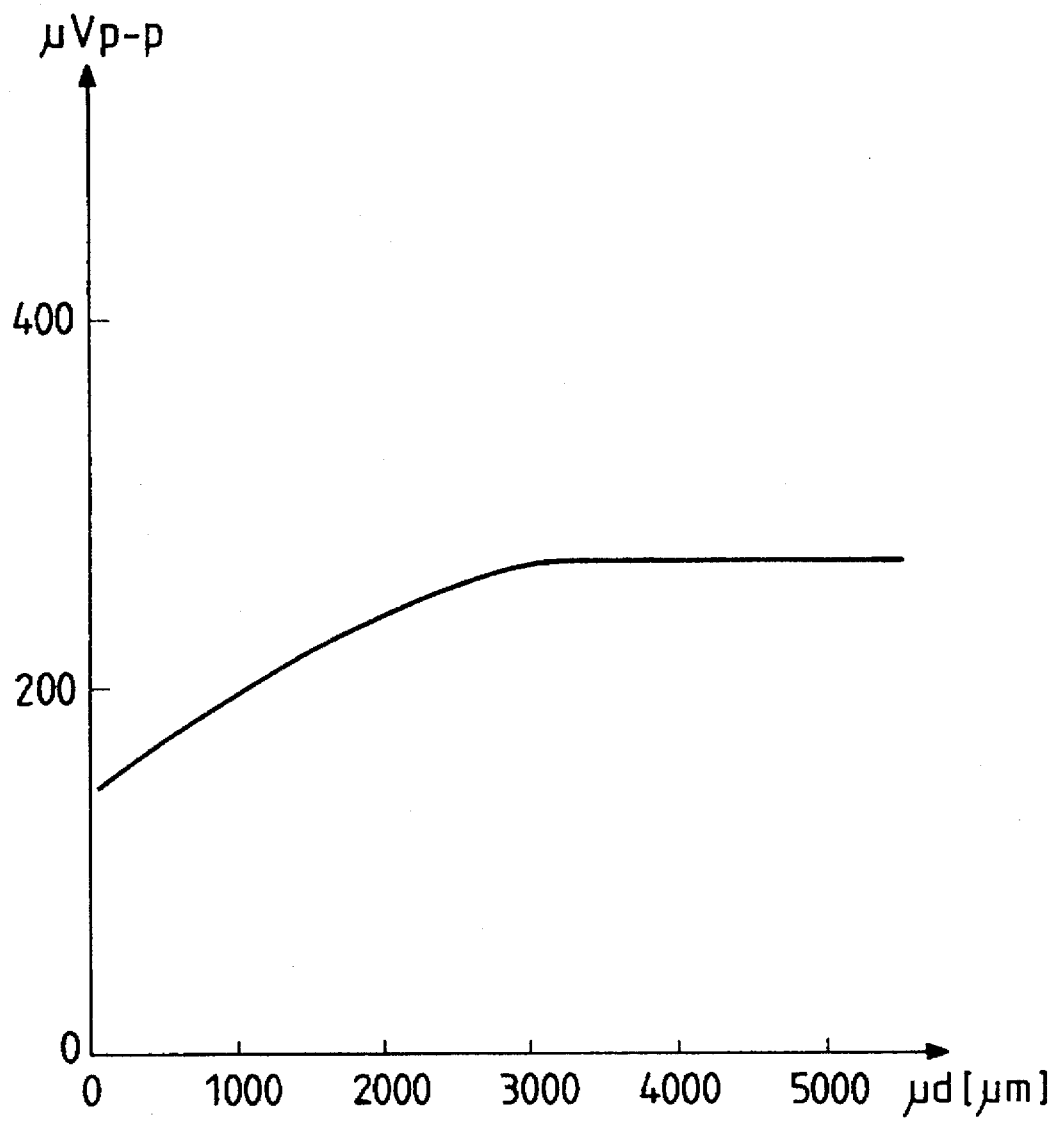

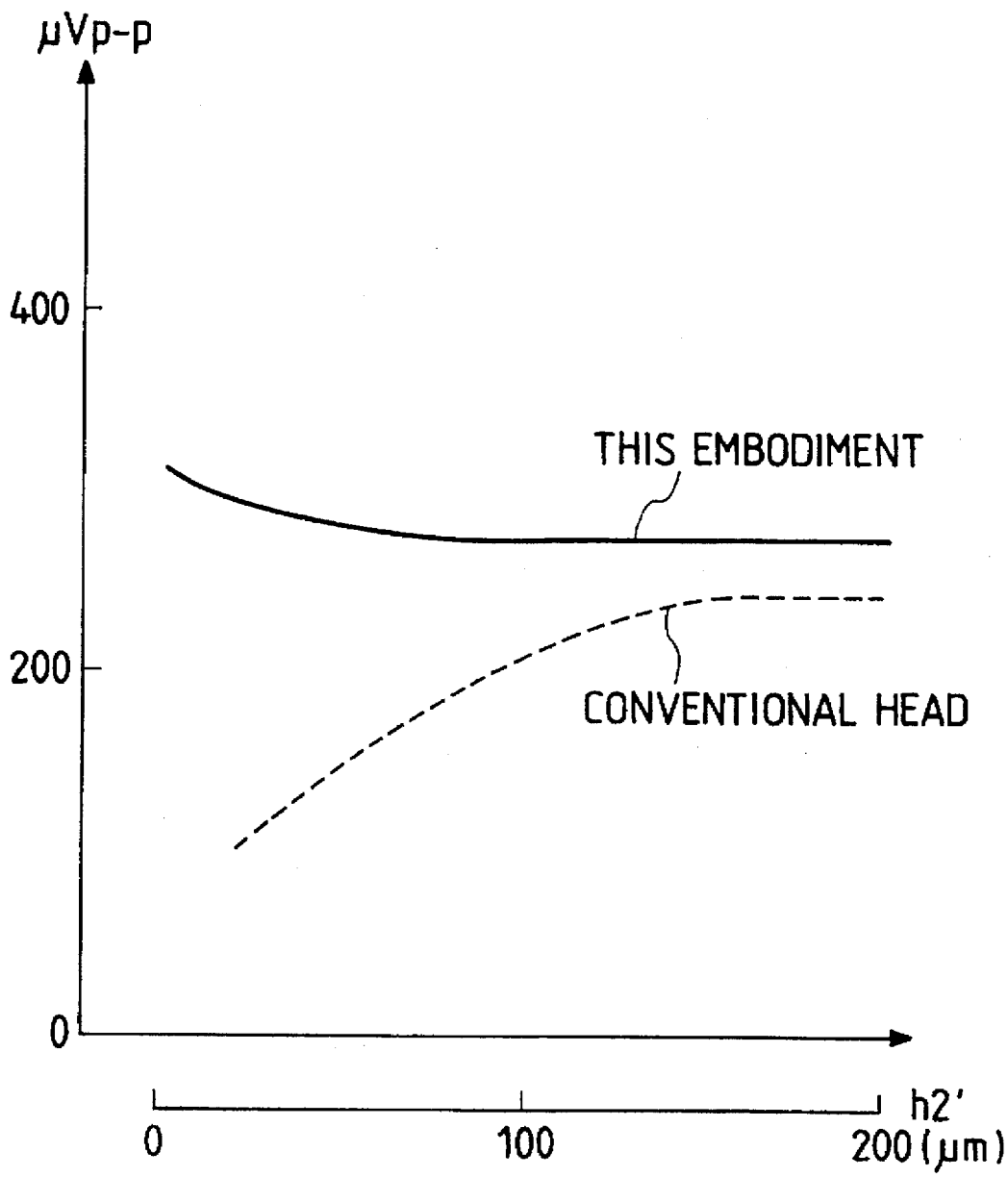

ly5,726,842

THIN-FILM TYPE MAGNETIC HEAD HAVING AN AUXILIARY MAGNETIC FILM

FIELD OF INVENTION

The present invention relates to a thin-film type magnetic head for use in a computer magnetic disk apparatus or the like.

BACKGROUND OF THE INVENTION

Recently, for meeting a requirement to improve the magnetic recording density in the magnetic recording art, attempts to improve the performance of the magnetic head concurrently with increasing the coercive force of the magnetic recording medium are being conducted. Further, to sufficiently derive the performance of the great-coercive-force magnetic recording medium, a metallic magnetic material such as a Fe-Al-Si series alloy, Ni-Fe series alloy and Co series (based) amorphous alloy having a high saturation magnetic flux density is being used as the material of the magnetic head in place of the conventional ferrite material. In accordance with the improvement of the recording density, it is required to make the track width of the magnetic head narrower, increase the transfer rate and have an excellent recording/reproduction performance in a high-frequency range. For meeting such requirements, a thin-film type magnetic head has been devised which uses as a magnetic core a metallic magnetic film interposed between non-magnetic bases.

FIG. 6 shows a conventional thin-film type magnetic head. This conventional thin-film type magnetic head, although having an appearance substantially similar to that of a conventional ferrite-made bulk type head, has only a metallic magnetic film 2 sandwiched between non-magnetic bases 1 which acts as a magnetic core, with the track width depending upon the thickness of the metallic magnetic film 2. To record, a coil 4 wound through a winding window 3 functions as an exciting coil to magnetize the metallic magnetic film (magnetic core) 2 to effect the recording on a magnetic medium by a leakage magnetic field from a magnetic gap 5. To reproduce, the coil 4 acts as a pickup coil to detect, as an induced electromotive force, a variation of the leakage magnetic flux from the recording medium which passes through the metallic magnetic film 2. Since, as described above, the metallic magnetic film 2 is made of a material such as Fe-Al-Si series alloy having a high saturation magnetic flux density and an excellent frequency characteristic of magnetic permeability, the thin-film type magnetic head has a higher recording ability and high-frequency characteristic as compared with the conventional ferrite-made head to thereby allow recording to a medium having a high coercive force above 1400 oersteds and usage at a high frequency above 10 MHz. Generally, the metallic film 2 is combined with an insulating film such as a silicon-dioxide-made film to effect a laminated structure so as to suppress the eddy current loss in the high frequency range.

For use in a computer magnetic disk apparatus, the thin-film type magnetic head is attached to a magnetic head slider, or integrally constructed with a magnetic head slider as illustrated in FIGS. 7A and 7B. In FIG. 7A, a thin-film type magnetic head 8 is adhered through an adhesive layer 7 to a floating slider 6 to provide a composite-structure magnetic head slider. In FIG. 7B, non-magnetic bases 1 of the thin-film type magnetic head are constructed as a floating slider to provide an integral type magnetic head slider.

Further, in response to the recent progress whereby the size of the magnetic disk apparatus is reduced while its capacity is increased, the size of the magnetic head slider is also required to be reduced. Although the present slider is generally arranged to have a total height of about 600 μm (70% slider), a general use of a smaller-sized slider having a total height of about 400 μm can be foreseen.

However, in the above-described thin-film type magnetic head, in order to obtain a sufficient reproduction output, the number of turns of the coils 4 is required to be 30 to 50. Since the diameter of the coated conductive wire is 20 to 30 μm, it becomes difficult to reduce the dimension of the winding window 3 if the winding of the wire is to be easily done. Accordingly, for the size-reduction of the thin-film type magnetic head, it is required to reduce the width h1 of the back portion of the magnetic core and the width h2 of the side portion thereof (see FIG. 6). On the other hand, in the conventional thin-film type magnetic head, since only the metallic magnetic film 2 acts as the magnetic core, by decreasing the aforementioned widths h1 and h2 of the magnetic core up to above a certain degree, the magnetic resistance of the decreased portion of the magnetic core becomes higher. The coefficient η of the magnetic core thus becomes lower, thereby decreasing the reproduction output. Depending upon the thickness of the metallic magnetic film 2, the magnetic permeability and the shape of the core, the limit values of the core widths h1 and h2 which can deteriorate the reproduction output are known to be about 100 to 150 μm. For example, in the case of a thin-film type magnetic head whose magnetic core comprising a metallic magnetic film 2 has a thickness of 7 μm and whose magnetic permeability is 2000, when the width h2 of the core side portion is fixed at 200 μm, the reproduction output of the magnetic head would vary in accordance with the variation of the width h1 of the core back portion as illustrated in FIG. 8. When reducing the back portion width h1 to below 150 μm, the reproduction output is lowered as indicated by a dotted line in FIG. 5.

Such a problem can be resolved by a magnetic manufacturing method disclosed in Japanese Patent Provisional Publication No. 58-70418. However, in that case, a ferrite core being provided at a back portion of a core half is limited in its thickness reduction. Hence, it is difficult to reduce the size of the magnetic head.

SUMMARY OF THE INVENTION

It is therefore an object of the present invention to produce a thin-film type magnetic head which is capable of realizing the size-reduction without lowering the reproduction output.

According to this invention, a thin film type magnetic head comprises first and second halves each having a magnetic core made of a metallic magnetic material and interposed between two non-magnetic bases, the first and second halves being joined to each other to form a magnetic gap therebetween and form a surface including the magnetic gap and coming into contact with a recording medium and the magnetic cores of the first and second halves being substantially positioned to be placed on the same plane. Also included in the magnetic head is an auxiliary film made of a magnetic material and disposed on a surface of the first and second halves which is not the medium-contact surface. Preferably, this auxiliary film is disposed on the surface which is at the opposite side to the medium-contact surface or disposed on a side surface of one of the first and second halves which is adjacent to the medium-contact surface.

BRIEF DESCRIPTION OF THE DRAWINGS

The object and features of the present invention will become more readily apparent from the following detailed description of the preferred embodiments taken in conjunction with the accompanying drawings in which:

FIG. 2 is a graphic illustration for describing variation of the reproduction output of the FIG. 1A magnetic head in accordance with variation of a back portion width of the FIG. 1A magnetic head;

FIG. 3 is a graphic illustration for describing variation of the reproduction output of the FIG. 1A magnetic head in accordance with variation of the production of the relative magnetic permeability and thickness of an auxiliary film of the FIG. 1A magnetic film;

FIG. 5 is a graphic illustration for describing variation of the reproduction output of the FIG. 4 magnetic head in accordance with variation of the side portion width of the FIG. 4 magnetic head;

DETAILED DESCRIPTION OF THE INVENTION

Figure 1A:
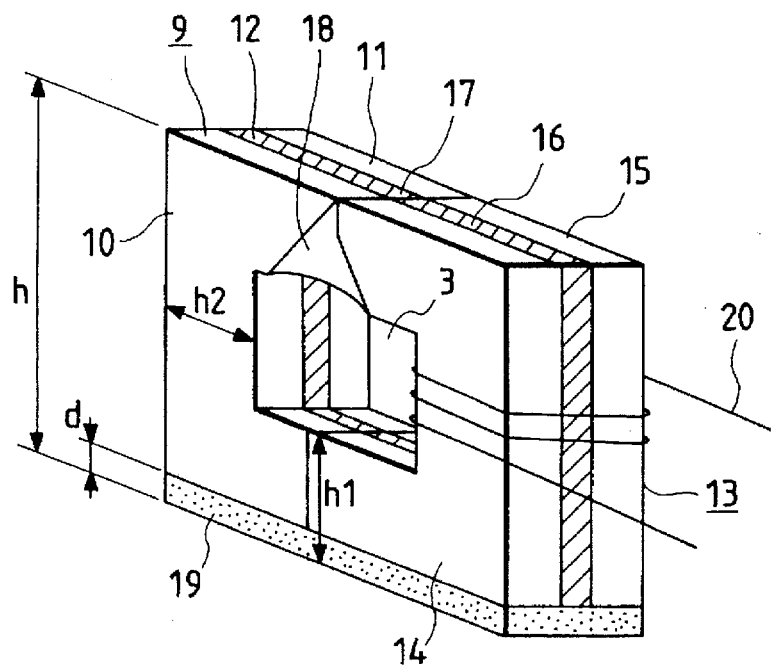
FIG. 1A is a perspective view showing a thin film type magnetic head according to a first embodiment of this invention.

Referring now to FIG. 1A, a description will be made hereinbelow in terms of a thin-film type magnetic head according to an embodiment of this invention. In FIG. 1A, the magnetic head comprises a first half 9 and a second half 13 each having a C-configuration and having a winding groove. The first half 9 comprises a pair of non-magnetic bases 10, 11 and a magnetic core 12 provided between the pair of non-magnetic bases 10 and 11. Similarly, the second half 13 comprises a pair of non-magnetic bases 14, 15 and a magnetic core 16 provided between the pair of non-magnetic bases 14 and 15. Each of the non-magnetic bases 10, 11 and 14, 15 is made of a ceramic material such as α-$Fe_2O_3$ (hematite) and calcium titanate. The first and second halves 9 and 13 are abutted against each other so that the magnetic cores 12 and 16 are in opposed relation to each other, and joined through a bonding glass 18 to form a magnetic gap 17. Designated at numeral 19 is an auxiliary film provided on surfaces (rear surfaces) of the first and second core halves 9 and 13 which are at the opposite side to the surfaces (front surfaces) thereof to be positioned to face (come into contact with) a recording medium. This auxiliary film 19 is made of a soft magnetic material and provided to be substantially perpendicular to and brought into contact with the magnetic cores 12 and 16. Numeral 20 is a coil wound only on the second half 13. Here, it is also appropriate that the coil 20 is provided with respect to the first half 9 or both the first and second halves 9 and 13.

Figure 1B:
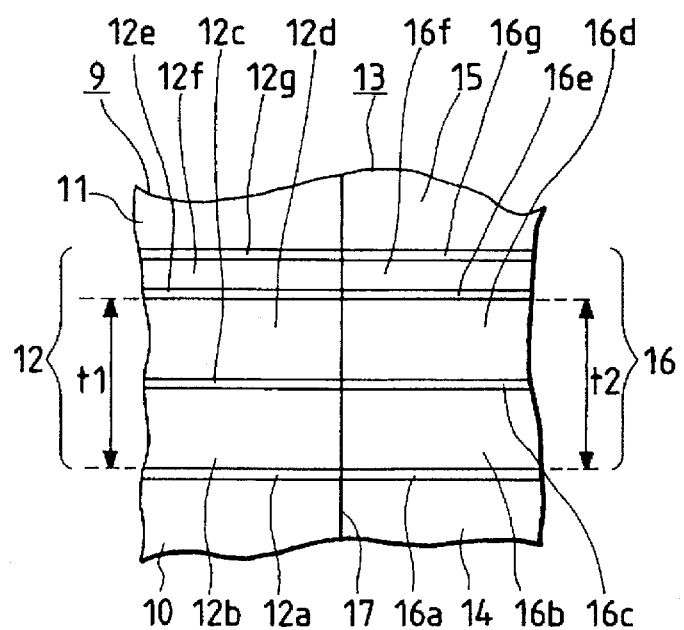
FIG. 1B is a partial view showing an arrangement of a magnetic core of the FIG. 1A magnetic head.

A detailed description will be made hereinbelow in terms of the magnetic cores 12 and 16. First, the description will be made with reference to FIG. 1B in terms of the case that the magnetic core has a laminated structure. FIG. 1B is a partial and enlarged plan view showing a magnetic core formed by piling up metallic magnetic films. In FIG. 1B, designated at 12a is an insulating film formed on the non-magnetic base 10 and made of an insulating material such as $SiO_2$. This insulating film 12a can be formed in accordance with the thin film formation technique such as a sputtering method. Here, it is preferable that the thickness of the insulating film 12a is approximately 0.4 μm to 0.5 μm. On the insulating film 12a there is formed a metallic magnetic film 12b made of a metallic magnetic material such as a Fe-Si-Al series alloy and Fe-Ta-Zr-N alloy. This metallic magnetic film 12b can be formed in accordance with a thin film formation technique such as sputtering method and plating method. Further, on the metallic magnetic film 12b there is formed an insulating film 12c made of an insulating material such as $SiO_2$. This insulating film 12c can also be formed in accordance with a thin film formation technique such as a sputtering method. It is preferable that the thickness of the insulating film 12c is below 0.2 μm. Moreover, on the insulating film 12c there is formed a metallic magnetic film 12d having the substantially same structure as the above-mentioned metallic magnetic film and made of and formed by the substantially same material and formation technique as the metallic magnetic film 12b. Reference 12e designates an insulating film formed on the metallic magnetic film 12d. This insulating film 12e has the substantially same structure and is made of and manufactured by the substantially same material and formation technique as the above-mentioned 12a. Further, reference 12f denotes a junction glass on the insulating film 12e, which glass is made of a PbO series low melting point glass material. The junction glass 12f is manufactured in accordance with a thin film formation technique such as sputtering method and preferably has a thickness below 0.5 μm. Still further, reference 12g depicts an insulating film provided on the junction glass 12f and made of an insulating material such as $SiO_2$. This insulating film 12g can similarly be manufactured in accordance with a thin film formation technique such as a sputtering method. It is preferable that the thickness of the insulating film 12g is below 0.3 μm. In practice, the insulating film 12a to the junction glass 12f are successively piled up on the non-magnetic base 10 and the insulating film 12g is formed on the non-magnetic base 11, and then the non-magnetic bases 10 and 11 are abutted against each other so that the insulating film 12g and the junction glass 12f are in opposed relation to each other, and a thermal process is then effected with respect to the abutting portions to soften the junction glass 12f before cooling it so that the non-magnetic bases 10 and 11 are joined to each other.

Here, the width (track width) of the magnetic core 12 is set to t1 as indicated in FIG. 1B. Although depending on a condition of use and others, the track width t1 is preferable to be about 4 μm to 10 μm. The thickness of the metallic magnetic films 12b and 12d are determined in accordance with the track width t1.

The magnetic core 16 is constructed by the substantially same formation technique and made of the substantially same material as the magnetic core 12, and arranged to have substantially same structure and thickness as the magnetic core 12. That is, an insulating film 16a, a metallic magnetic film 16b, an insulating film 16c, a metallic magnetic film 16d, a junction glass 16f and an insulating film 16g are successively formed on the base 14. Here, the layers 16a to 16g substantially correspond in structure to the layers 12a to 12g of the magnetic core 12, respectively. The width (track width) of the magnetic core 16 is set to t2. Similarly, the track width t2 depends on the condition of use and others and is generally preferable to be about 4 μm to 10 μm. The thicknesses of the metallic magnetic films 16b and 16d are determined to have the track width t2. The track width t2 is arranged to be equal to the track width t1.

The first and second halves 9 and 13 thus arranged are abutted against each other through the magnetic gap 17 so that the magnetic cores are in opposed relation to each other, and then joined or associated with each other by means of the bonding glass 18 as illustrated in FIG. 1A. Although in this embodiment the number of the metallic magnetic films is 2, it is appropriate that the number thereof is 3 or more.

Figure 1C:
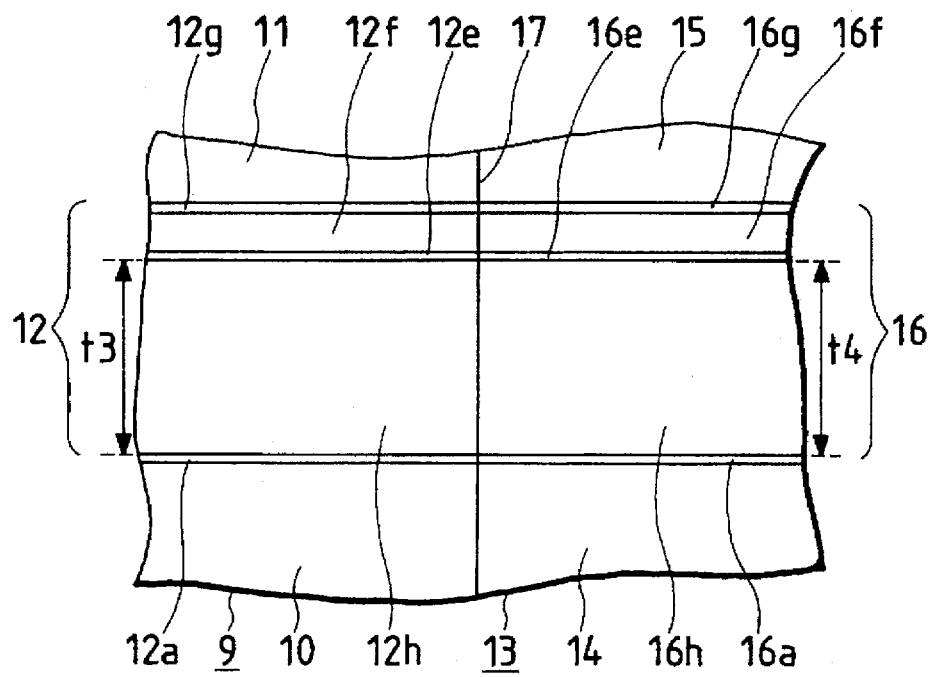
FIG. 1C is a partial view showing another arrangement of a magnetic core of the FIG. 1A magnetic head.

Secondly, a description will be made hereinbelow with reference to FIG. 1C in the case that the magnetic core comprises a single layer. In FIG. 1C, as well as in FIG. 1B, references 12a, 12e and 12g respectively designate insulating films, 12f depicts a junction glass, and 16a, 16e and 16g respectively denote insulating films. Further, reference 12h a metallic magnetic film formed on the insulating film 12a in accordance with a thin film formation technique such as a sputtering method and plating method, and made of a metallic magnetic material such as an Fe-Si-Al series alloy and Fe-Ta-Zr-N alloy. Reference 16h denotes a metallic magnetic film formed on the insulating film 16a as well as the metallic magnetic film 12h. The track width of the magnetic core 12 becomes equal to the thickness of the metallic magnetic film 12h and is t3 as indicated in FIG. 1C. Further, the track width of the magnetic core 16 becomes the thickness of the metallic magnetic film 16h and is t4 as indicated in the same figure. The thicknesses t3 and t4 of the metallic magnetic core films 12 and 16 are substantially the same and are preferable to be about 4 μm to 10 μm.

Figure 1D:
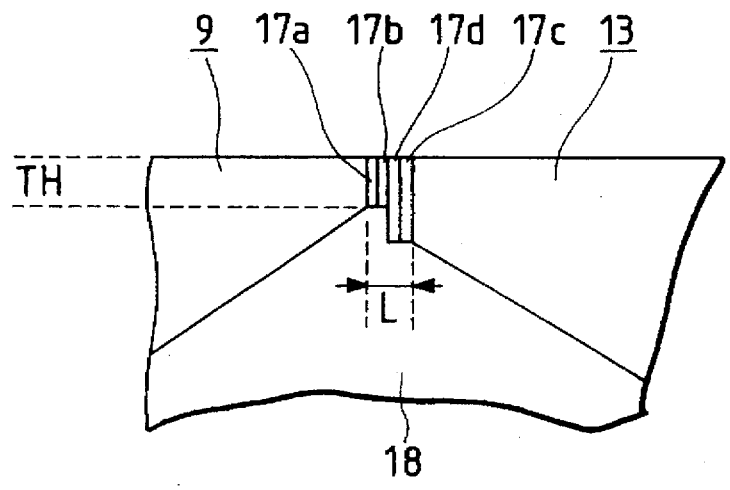
FIG. 1D is a partial view showing an arrangement of a magnetic gap of the FIG. 1A magnetic head.

Further, the magnetic gap 17 will be described hereinbelow with reference to FIG. 1D. The description will be made in terms of the magnetic gap having a multi-layer structure. In FIG. 1D, an $SiO_2$ film 17a and an adhesive glass 17b are successively layered on a surface of the first half 9, which faces the gap 17, so as to form a laminated structure. Similarly, an $SiO_2$ film 17c and an adhesive glass 17d are also successively layered on a surface of the second half 13, which faces the gap 17 or which takes the opposed relation to the first half 9 surface through the gap 17, so as to form a laminated structure. For assembling the magnetic head, the first and second halves 9 and 13 are abutted against each other and joined so that the adhesive glasses 17b and 17d take the opposed relation to each other, thus producing the magnetic gap 17. The adhesive glasses 17b and 17d are made of a PbO series low melting glass material or the like and formed in accordance with a thin film formation technique such as a sputtering method. Here, although in this embodiment the magnetic gap 17 is constructed with a plurality of layers comprising the non-magnetic films, it is appropriate that the magnetic gap 17 is constructed with a single layer comprising a non-magnetic film.

Further, a description will be made in terms of the auxiliary film 19. This auxiliary film 19 is made of a soft magnetic material such as a Ni-Fe series alloy and a nitrogen magnetic material (for example, Fe-Al-Si-N film). It is also possible that the auxiliary film 19 is constructed with a multi-layer film (artificial lattice film) such as an Fe-Si/Ni-Fe film. The auxiliary film 19 can be manufactured in accordance with a thin film formation technique such as a sputtering method and plating method (depending on the kind of the material). Here, it is preferable that the thickness of the auxiliary film 19 be about 3 to 5 μm. However, in use, it is possible to set the thickness of the auxiliary film 19 to be out of this range. Moreover, although in this embodiment the auxiliary film 19 is disposed to be brought into contact with the magnetic cores 12 and 16, it is also appropriate that a thin non-magnetic film (for example, having the thickness of 0.3 μm to 0.5 μm) be interposed between the magnetic cores 12, 16 and the auxiliary film 19.

The effect of the provision of the auxiliary film 19 is as follows. The thin film type magnetic head is such that the magnetic cores 12 and 16 have single structures as shown in FIG. 1C and the metallic magnetic films 12h and 16h are made of an Fe-Al-Si alloy to have a thickness of 7 μm. The initial magnetic permeability of the magnetic cores 12 and 16 at 1 MHz is about 2000, the length L of the magnetic gap 17 is set to 0.3 μm and the depth TH of the magnetic gap 17 is set to 5 μm. The auxiliary film 19 is constructed with a Co-series amorphous alloy film formed in accordance with a sputtering method to have a thickness of 2 μm, and the initial magnetic permeability of the auxiliary film 19 at 1 MHz is about 2000.

FIG. 2 is a graphic diagram showing variation of the reproduction output of the magnetic head by a solid line in the case that the core width h2 of the side portion of each half is set to 200 μm and the the core width h1 of the back portion thereof varies in a range of 200 to 20 μm. In addition, FIG. 2 shows, by a dotted line, the test result of a conventional thin film type magnetic head having the substantial same structure as this embodiment except for the auxiliary film 19. Here, in the test, the magnetic medium is such that the coercive force is 1400 oersteds and Br (residual magnetic flux density) δ (film thickness)=450 μmG. Further, the floating amount is 0.1 μm, the medium speed is 8.3 m/s and the recording frequency is 6 MHz.

From FIG. 2, it is seen that the reproduction output of the conventional thin film type magnetic head is lowered when the core width h1 of the back portion is below 150 μm, while the reproduction output of the thin film type magnetic head according to this embodiment does not lower even if the core width h1 of the back portion is reduced up to 20 μm. That is, in the conventional thin film type magnetic head, difficulty is encountered to reduce the total height h to below 500 μm if the magnetic characteristic is taken into account. Yet, in the thin film type magnetic head according to this embodiment, it is possible to reduce the total height h to less than 400 μm. This is because the auxiliary film 19 having a high magnetic permeability, is magnetically coupled to the metallic magnetic film of the magnetic core to act as an auxiliary core to prevent the lowering of the reproduction output which can occur in accordance with the reduction of the core width.

It is preferable that the auxiliary film 19 is arranged such that the product of the relative magnetic permeability μ and the film thickness d (μm) is above 3000. This is because the auxiliary film 19 cannot sufficiently act as the auxiliary film when the product of the relative magnetic permeability μ and the film thickness d is below 3000. FIG. 3 shows the variation of the reproduction output of the magnetic head due to the product of the relative magnetic permeability μ and film thickness d of the auxiliary film 19 in the case that the core width h1 of the back portion is 50 μm and the core width h2 of the side portion is 200 μm. As obvious from FIG. 3, the reproduction output is lowered when the production of the relative magnetic permeability μ and film thickness d of the soft magnetic film 19 becomes below 3000.

Figure 4:
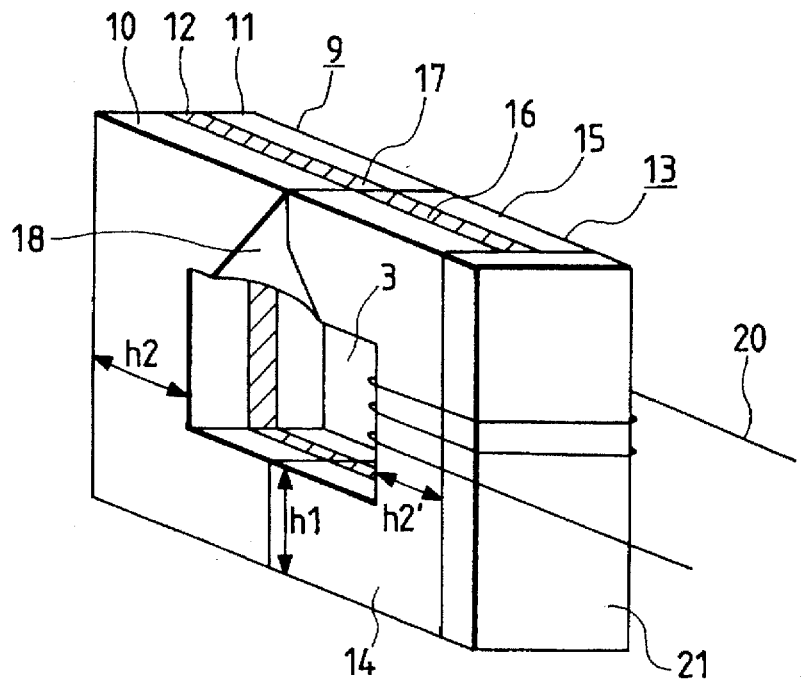
FIG. 4 is a perspective view showing an arrangement of a thin film type magnetic head according to a second embodiment of this invention.
Figure 6:
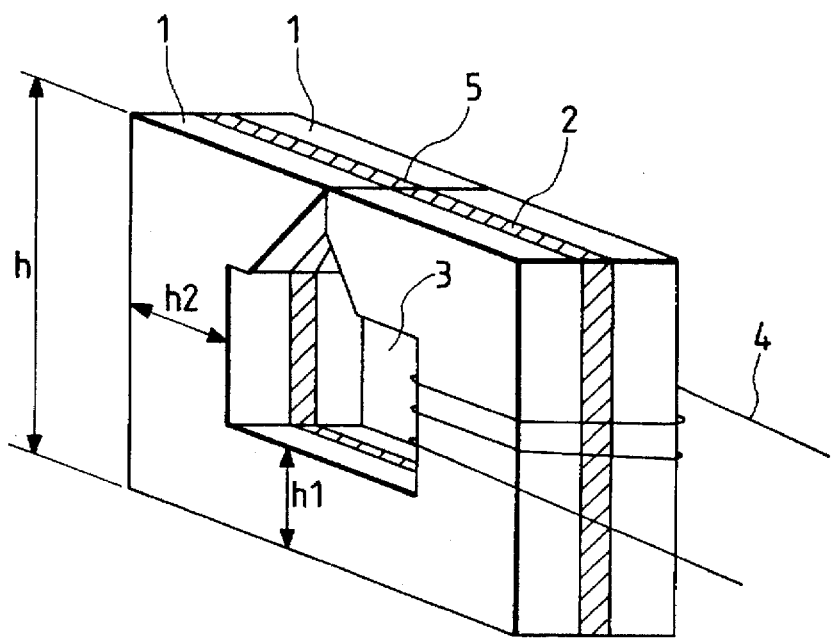
FIG. 6 is a perspective view showing an arrangement of a conventional thin film type magnetic head.
Figure 7A:
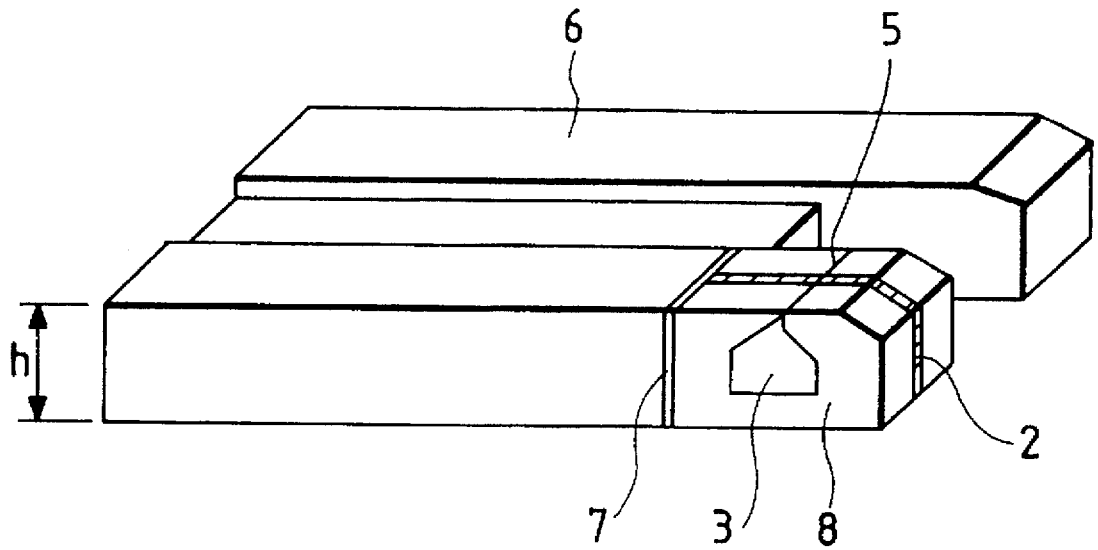
FIGS. 7A and 7B show magnetic head sliders each having a conventional thin film type magnetic head.
Figure 7B:
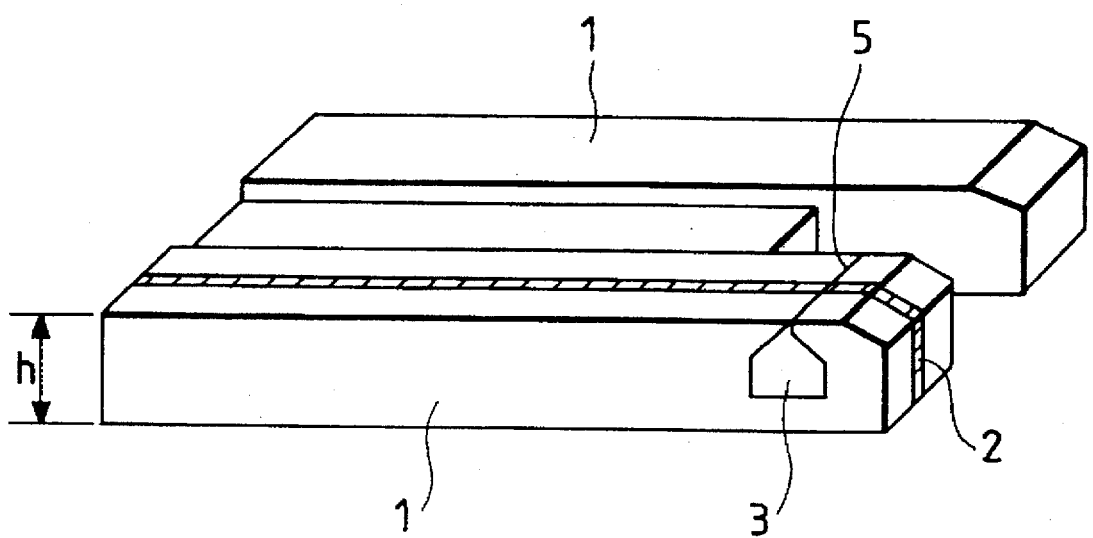
Figure 8:
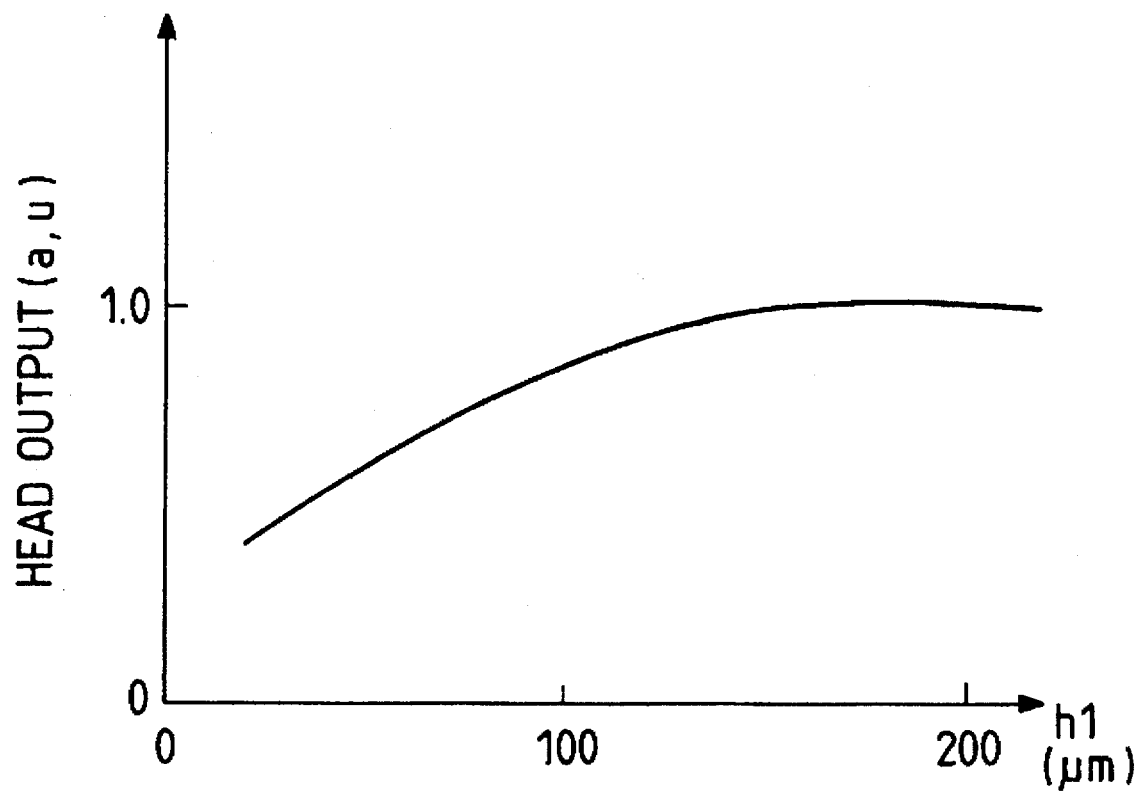
FIG. 8 is a graphic illustration for describing variation of the reproduction output in accordance with variation of the back portion width of a conventional thin film type magnetic head.

Another embodiment of this invention will be described hereinbelow with reference to FIG. 4 where parts corresponding to those in FIG. 1A are marked with the same references. One difference of this embodiment from the FIG. 1A embodiment is the position of the auxiliary core. That is, in the FIG. 4 thin film type magnetic head, an auxiliary film, designated at numeral 21, is disposed on a side surface of the second half 13. This arrangement can also provide an effect as shown in FIG. 5. FIG. 5 shows, by a solid line, the variation of the reproduction output of this magnetic head in the case that the core width h1 of the back portion is fixed to 200 µm, the core width h2 of the side portion of the first half (slider side core half) 9 is fixed to 200 µm, and the core width h2' of the side portion of the second half (winding side half) 13 varies in a range of 200 to 20 µm. Here, the test condition is the same as the condition in FIG. 2. In FIG. 5, a dotted line shows a test result of a conventional thin film type magnetic head. From FIG. 5, it is seen that in the conventional thin film type magnetic head, difficulty is encountered to reduce the the core width h2' to below 150 µm, while in this embodiment it is possible to reduce the core width h2' to below 150 µm. The reduction of the core width h2' of the winding portion allows easy attachment of a bobbin for winding and further allows the reduction of the air-core inductance of the coil 20.

Although in the above-described embodiments the auxiliary film is disposed at the outside of the halves or half, it is possible that the auxiliary film is disposed at the inside of the half or on a surface of the winding window. However, the attachment of the auxiliary film to the outside portion is easier in working. Further, although in the above-described embodiments each of the two halves has a metallic magnetic film, it is also appropriate that one of the halves comprises a ferrite core or the like. This can offer a similar effect.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A thin film type magnetic head comprising:
   a magnetic head assembly including first and second halves each having a magnetic core made of a metallic magnetic material and interposed between two non-magnetic bases, said first and second halves being joined to each other to form a magnetic gap therebetween and form a first surface including said magnetic gap and coming into contact with a recording medium, said magnetic cores of said first and second halves being substantially positioned along the same plane; and
   an auxiliary film made of a soft magnetic material, said auxiliary film being disposed on a second surface formed on said magnetic head assembly different from said first surface to magnetically connect with the magnetic cores of said first and second halves, said auxiliary film being so formed as to provide the product of its relative magnetic permeability and its thickness to be above 3000.

2. A thin film type magnetic head as claimed in claim 1, wherein said auxiliary film is disposed on said second surface which is at the opposite side to said first surface.

3. A thin film type magnetic head as claimed in claim 1, wherein said auxiliary film is disposed so as to be brought into contact with said magnetic cores of said first and second halves.

4. A thin film type magnetic head as claimed in claim 1, wherein said thickness of said auxiliary film is 3 to 5 µm.

5. A thin film type magnetic head as claimed in claim 1, wherein a distance separating said second surface and a surface positioned opposite thereto is less than 400 µm.

6. A thin film type magnetic head as claimed in claim 1, wherein said magnetic core comprises a plurality of layers each being made of a metallic magnetic material.

7. A thin film type magnetic head as claimed in claim 1, wherein said magnetic core comprises a single layer made of a metallic magnetic material.

8. A thin film type magnetic head as claimed in claim 1, wherein said second surface of said magnetic head assembly is a side surface of one of said first and second halves which is adjacent to said first surface.

9. A thin film type magnetic head as claimed in claim 8, wherein said first and second halves have channel portions to form a winding window for a winding at a center portion of said magnetic head when being joined to each other, a length between said side surface on which said auxiliary film is disposed and an inner surface of said winding window in opposed relation to said side surface being arranged to be shorter than a length between a side surface of the other half adjacent said first surface and an inner surface of said winding window facing said first-mentioned inner surface.

10. A thin film type magnetic head as claimed in claim 9, wherein said winding wounds around said first-mentioned inner surface and an outer surface of said auxiliary film.

11. A thin film type magnetic head as claimed in claim 1, further comprising a thin film disposed between said auxiliary film and said surface of said first and second halves, said thin film being made of a non-magnetic material.

12. A thin film type magnetic head as claimed in claim 11, wherein said thin film has a thickness of 0.3 µm to 0.5 µm.

13. A thin film type magnetic head comprising:
   a magnetic head assembly including first and second C-shaped halves each including a magnetic core made of a metallic magnetic material and two non-magnetic bases having interposed therebetween the magnetic core, said first and second C-shaped halves being connected to each other to form an aperture with the magnetic cores being in alignment with each other to form a magnetic gap therebetween, said first and second C-shaped halves defining first and second surfaces of the magnetic head formed on said magnetic head assembly, the first surface, including the magnetic gap, being provided opposite the second surface on said magnetic head assembly to be in engagement with a recording medium; and
   an auxiliary film made of a soft magnetic material, said auxiliary film being disposed on the second surface of said magnetic head assembly to establish magnetic connection with the magnetic cores of said first and second halves, said auxiliary film being arranged so as to provide the product of its relative magnetic permeability and its thickness to be above 3000.

14. A thin film type magnetic head as claimed in claim 13, wherein said auxiliary film is disposed so as to be brought into contact with said magnetic cores of said first and second halves.

15. A thin film type magnetic head as claimed in claim 13, wherein said thickness of said auxiliary film is 3 to 5 µm.

16. A thin film type magnetic head as claimed in claim 13, wherein a distance separating said second surface and a surface positioned opposite thereto is less than 400 µm.

17. A thin film type magnetic head as claimed in claim 13, wherein said magnetic core comprises a plurality of layers each being made of a metallic magnetic material.

18. A thin film type magnetic head as claimed in claim 13, wherein said magnetic core comprises a single layer made of a metallic magnetic material.

19. A thin film type magnetic head as claimed in claim 13, wherein said second surface of said magnetic head assembly is a side surface of one of said first and second halves which is adjacent to said first surface.

20. A thin film type magnetic head as claimed in claim 19, wherein said first and second halves have channel portions to form a winding window for a winding at a center portion of said magnetic head when being joined to each other, a length between said side surface on which said auxiliary film is disposed and an inner surface of said winding window in opposed relation to said side surface being arranged to be shorter than a length between a side surface of the other half adjacent said first surface and an inner surface of said winding window facing said first-mentioned inner surface.

21. A thin film type magnetic head as claimed in claim 20, wherein said winding wounds around said first-mentioned inner surface and an outer surface of said auxiliary film.

22. A thin film type magnetic head as claimed in claim 13, further comprising a thin film disposed between said auxiliary film and said surface of said first and second halves, said thin film being made of a non-magnetic material.

23. A thin film type magnetic head as claimed in claim 22, wherein said thin film has a thickness of 0.3 μm to 0.5 μm.

* * * * *